Oct. 18, 1955     G. C. SIPIOR     2,721,081
AMUSEMENT ROUNDABOUT

Filed Dec. 12, 1952     2 Sheets-Sheet 1

INVENTOR.
GEORGE C. SIPIOR
BY
Bean, Brooks, Buckley & Bean
ATTORNEYS

Oct. 18, 1955　　　　　G. C. SIPIOR　　　　2,721,081
AMUSEMENT ROUNDABOUT
Filed Dec. 12, 1952　　　　　　　　　　2 Sheets-Sheet 2
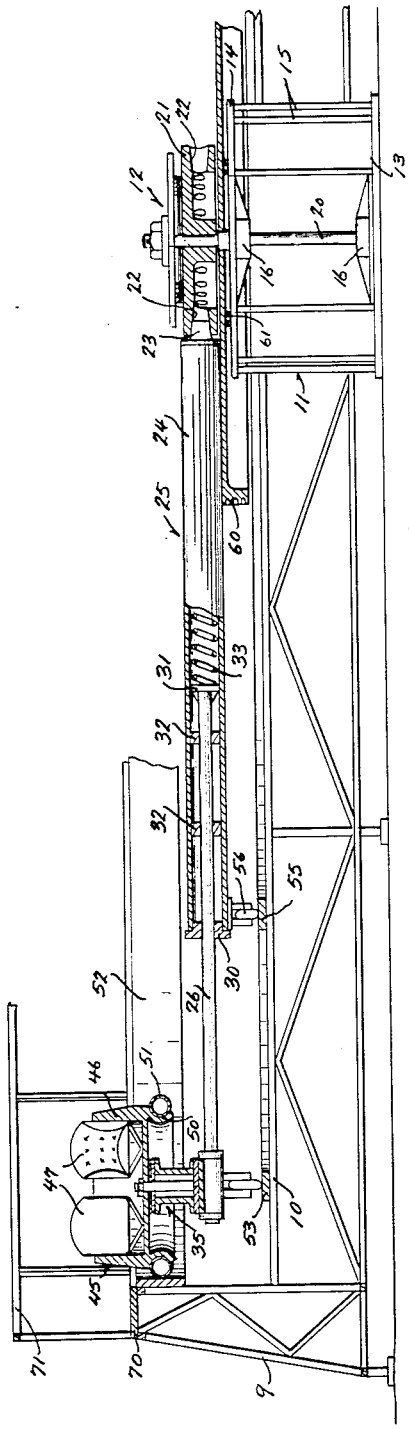
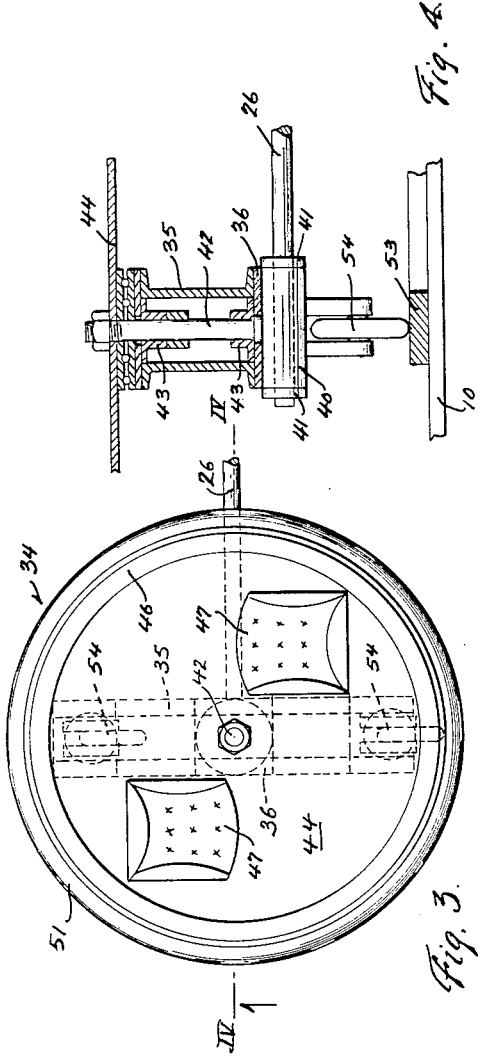
INVENTOR.
GEORGE C. SIPIOR
BY
Beau, Brooks, Buckley & Beau
ATTORNEYS – # United States Patent Office 2,721,081
Patented Oct. 18, 1955

2,721,081

AMUSEMENT ROUNDABOUT

George C. Sipior, North Tonawanda, N. Y., assignor to Joseph F. Sipior, North Tonawanda, N. Y.

Application December 12, 1952, Serial No. 325,635

4 Claims. (Cl. 272—37)

My invention relates in general to amusement ride devices, and particularly to a device having a plurality of cars movable in a predetermined serpentine path.

The principal object of my invention is to provide an amusement device having a series of cars each carried by a horizontally arranged telescoped arm designed to be moved in a horizontal plane.

Another object is to provide a device having a number of cars which are each rotated upon an axis as they travel in a horizontal plane, and which are movable radially toward and from a common center.

A further object is to provide a plurality of radial arms each mounted at its inner end in a pivot member and having at its outer end a reciprocating telescoped rod.

Furthermore, it has been an object to provide each radial arm with a helical spring to maintain the reciprocating rod in yieldably extending position.

A further object is to provide a device which may be readily disassembled for convenience in transportation.

The above objects and advantages have been accomplished by the devices shown in the accompanying drawings, of which:

Fig. 2 is a fragmentary sectional elevation taken on line II—II of Fig. 1;

Fig. 3 is an enlarged plan view of one of the passenger cars; and,

Fig. 4 is an enlarged fragmentary sectional view of one of the cars taken on line IV—IV of Fig. 3.

Figure 1:
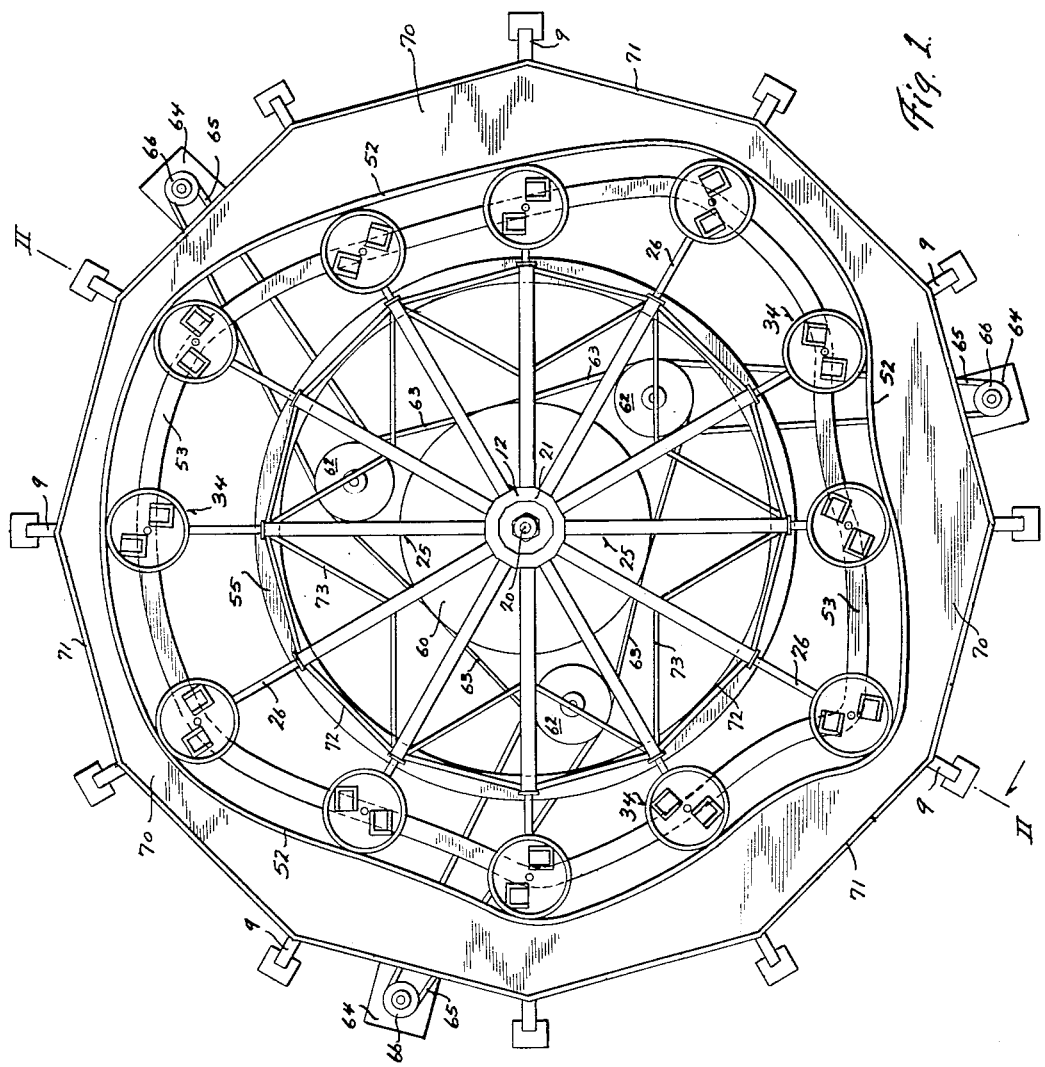
Fig. 1 is a plan view of my invention.

The device comprises a plurality of supporting struts 9 connected to a number of horizontal track supporting members 10 which extend toward a centrally arranged pivot supporting member 11. The track supporting studs and supporting members are preferably connected together in suitable well-known manner so as to provide a sturdy knock down structure for ready assembling and convenient transportation. The track supporting member 11 is provided with a base plate 13 and with a top platform 14 which are connected in spaced relation by means of a plurality of studs 15. A bearing 16 is carried by the base plate and the top platform for the pivotal support of a pivot shaft 20 of a pivot member 12. This shaft extends upwardly above the top platform where it is provided with a coupling member 21. This coupling member is preferably polygonal in form having as many sides as the number of radiating arms, and it is formed with a plurality of radially arranged sockets 22 for the reception of the tapered members 23 formed on the inner ends of the cylinders 24 of the radial arms 25. Each radial arm also comprises a plunger rod 26 which passes through a bearing 30 formed at the outer end of the cylinder and which has a plunger 31 at its inner end. The plunger rod is preferably supported by a number of bearings 32 disposed within the cylinder. A helical spring 33 is mounted within each cylinder and has its outer end bearing against the plunger 31 of each of the radial arms, whereby the plunger rod is normally urged in an outward direction.

Each of the radial arms carries a car 34 at its outer end. Each car is supported by a diametrically arranged car supporting member 35 which is mounted upon a car bracket 36. Each of the brackets is formed with a sleeve 40 which is mounted upon the outer end of the plunger rod 26 and is kept in position by means of suitable collars 41 secured to the shaft. Each car supporting member carries a stub shaft 42 mounted in suitable bearings 43 and secured to the bottom 44 of the car. An antifriction bearing is disposed between the car bottom and the top of the car supporting member. The car is provided with a peripheral wall 46 having a downwardly projecting member 50 which is formed with a peripheral groove for the reception of a pneumatic buffer member 51. Each car is provided preferably with two seats 47 which are arranged so that the passengers may face each other.

Carried by the supporting struts 9 is a traction wall 52. This wall is positioned opposite the buffer members 51 of the cars; and, as shown in Fig. 1 it is of serpentine contour. A serpentine track 53 is mounted upon the track supporting members 10 and is substantially of the same contour as the traction wall 52. The cars are provided with swivel type casters 54 which are carried in spaced relation by the car supporting member 35 and which ride on the serpentine track 53. Also carried by the track supporting members 10 is an arm supporting track 55 which is preferably concentric with the axis of the pivot member 12, and each of the radial arms is supported by an arm supporting wheel 56 which rides upon the arm supporting track 55.

When in operation, the radial arms, together with the cars are rotated in a horizontal plane, and to accomplish this rotation I provide a relatively large driven sheave 60 which is supported by suitable antifriction bearings 61 and which is suitably connected to the radial arms 25. This driven sheave is connected to three jack shaft sheaves 62 arranged symmetrically about the pivot member and connected to the driven sheave by suitable belts 63. Each jack shaft sheave 62 is also connected to a suitable motor 64 by means of a belt 65 and driving sheave 66.

A platform 70 is provided for the use of the passengers and it is supported by means of the struts 9. A safety railing 71 is arranged around the perimeter of the platform and it is carried by the struts.

From the foregoing it will be obvious that when the device is in operation, the radial arms will be moved around in a horizontal plane as the pivot member is rotated by the three motors 64. During such movement the cars carried by the radial arms will be carried around in a circular path. Since the helical spring of each of the radial arms keeps the plunger rod extended outwardly, each of the cars will be kept in firm driving contact with the serpentine traction wall, thereby causing the cars to be rotated upon their pivots in a direction opposite to the direction of rotation of the pivot member 12. The serpentine contour of the traction wall will cause each car to be reciprocated radially as it is being rotated, thus greatly increasing the thrill and excitement of the ride. During the reciprocating and rotating movement, the passengers will be moved through an arcuate path accelerating first from minimum to maximum rate of travel, and then decelerating from maximum to minimum rate.

The outer ends of the radial arms are secured together in spaced relation by means of a plurality of spaces 72 and are braced by means of a plurality of struts 73.

While I have shown each of the cars as having its periphery concentric with the axis, the pleasure of the ride may be further increased by mounting each of the cars so that its axis is somewhat eccentric to the periphery of the car. Further, instead of a helical spring to cause the plunger rod of the radial arms to be forced outwardly, I may use suitable hydraulic means. These and other modifications of the details herein shown and described may be made without departing from the spirit of my invention or the scope of the appended claims, and I do not therefore wish to be limited to the exact embodiments herein shown and described.

What is claimed is:

1. An amusement device comprising a primary support mounted to rotate on a vertical axis and having an annular series of radially disposed guides each with extensible rigid arms slidable in the guides along radial lines, a car mounted on the outer end of each arm to rotate about a secondary vertical axis thereon, a drive operable to rotate said primary support with its guides, extensible arms and cars as a unit, an undulatory abutment track encircling the unit, said rotatable cars having rims tracking along the encircling abutment track, and resilient means acting on the extensible arms to hold the car rims in driving contact with the encircling abutment track, said undulatory track having coplanar inwardly and outwardly curved portions lying in a plane substantially parallel to the path of travel of the cars to impart in and out movement to the cars along relatively fixed paths to correspondingly shorten and lengthen the effective arm length from the first axis of rotation for decreasing and increasing, respectively, the speeds of rotation of the cars about their sub axes.

2. An amusement device comprising a primary support mounted to rotate on a vertical axis and having an annular series of radially disposed guides each with extensible rigid arms slidable in the guides along radial lines, a car mounted on the outer end of each arm to rotate about a vertical axis thereon, a drive operable to rotate said primary support with its guides, extensible arms and cars as a unit, an undulatory abutment track encircling the unit, said rotatable cars having rims for tracking along the encircling abutment track, and resilient means acting on the extensible arms to hold the car rim in driving contact with the encircling abutment track.

3. An amusement device, comprising a rotatably mounted unit frame including a plurality of non-pivotal and fixedly related arms carried by said frame and comprising radially disposed cylinders rigidly secured thereto, a plunger slidably associated with each of said cylinders and formed with a T-shaped car supporting member carried by the outer end thereof, casters carried by said supporting member and responsive to the radial thrust of the T-shaped supporting member, a car rotatably carried by said T-shaped supporting member, a continuous vertically arranged traction wall having a serpentine contour arranged about said frame, each of the cars having peripheral contact with said wall for rotating the same, and a horizontally arranged track for supporting said casters, said track having a contour substantially the same as the contour of said wall.

4. An amusement device, comprising a rotatably mounted unit frame including a plurality of non-pivotal and fixedly related arms carried by said frame and comprising a radially disposed cylinder rigidly secured thereto, a plunger slidably mounted within each of said cylinders and formed with a T-shaped car supporting member carried by the outer end thereof, casters carried by said supporting member and responsive to the radial thrust of the T-shaped supporting member, a stub shaft carried by and extending upwardly from said supporting member, a car rotatably carried by each of said stub shafts, a continuous vertically arranged traction wall having a serpentine contour arranged about the frame, each of said cars having peripheral contact with said wall, a horizontally arranged car track for supporting said casters, said track having a contour substantially the same as the contour of said wall, a supporting wheel attached to the outer end of each cylinder, and an arm supporting track concentric with said frame for supporting said wheels.

References Cited in the file of this patent

UNITED STATES PATENTS

| 1,167,650 | Nachtigall | Jan. 11, 1916 |
| 1,652,975 | Davidson | Dec. 13, 1927 |
| 1,824,720 | Irsch | Sept. 22, 1931 |
| 2,319,327 | Johnson | May 18, 1943 |
| 2,594,678 | Parke et al. | Apr. 29, 1952 |

FOREIGN PATENTS

| 608,593 | France | Apr. 24, 1926 |
| 448,327 | Germany | Aug. 16, 1927 |
| 934,672 | France | Jan. 19, 1948 |